US011948744B2

(12) United States Patent
Jung et al.

(10) Patent No.: US 11,948,744 B2
(45) Date of Patent: Apr. 2, 2024

(54) MULTILAYER ELECTRONIC COMPONENT

(71) Applicant: SAMSUNG ELECTRO-MECHANICS CO., LTD., Suwon-si (KR)

(72) Inventors: Seo Won Jung, Suwon-si (KR); Won Kuen Oh, Suwon-si (KR); Gyu Ho Yeon, Suwon-si (KR); Seo Ho Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/716,202

(22) Filed: Apr. 8, 2022

(65) Prior Publication Data

US 2023/0215628 A1 Jul. 6, 2023

(30) Foreign Application Priority Data

Dec. 30, 2021 (KR) .................. 10-2021-0192726

(51) Int. Cl.
*H01G 4/008* (2006.01)
*H01G 4/232* (2006.01)
*H01G 4/248* (2006.01)
*H01G 4/30* (2006.01)

(52) U.S. Cl.
CPC .......... *H01G 4/008* (2013.01); *H01G 4/2325* (2013.01); *H01G 4/248* (2013.01); *H01G 4/30* (2013.01)

(58) Field of Classification Search
CPC ...... H01G 4/008; H01G 4/2325; H01G 4/248; H01G 4/30; H01G 4/012; H01G 4/18
See application file for complete search history.

(56) References Cited

U.S. PATENT DOCUMENTS

| 2001/0043454 | A1* | 11/2001 | Yoshii | H01G 4/232 361/321.2 |
| 2009/0207551 | A1* | 8/2009 | Suzuki | C04B 35/49 501/137 |
| 2009/0323253 | A1* | 12/2009 | Kobayashi | H01G 4/005 427/79 |

(Continued)

FOREIGN PATENT DOCUMENTS

| JP | 2008-300769 A | 12/2008 |
| JP | 2020-77784 A | 5/2020 |

*Primary Examiner* — Michael P McFadden
(74) *Attorney, Agent, or Firm* — Morgan, Lewis & Bockius LLP (57) ABSTRACT

A multilayer electronic component includes a body including a dielectric layer and internal electrodes disposed alternately with the dielectric layer therebetween and including first and second surfaces opposing each other in a first direction, third and fourth surfaces opposing each other in a second direction, and external electrodes disposed on the body. One end of each internal electrode is connected to the third or fourth surface. The external electrodes include a first electrode layer disposed on the third and fourth surfaces and including a conductive metal and a second electrode layer disposed on the first electrode layer, including silver (Ag) and glass, and further including one or more of palladium (Pd), platinum (Pt), and gold (Au), and the first electrode layer is disposed to cover all of one end of each internal electrode connected to the third and fourth surfaces and does not extend to the other surfaces.

20 Claims, 7 Drawing Sheets

(56) References Cited

U.S. PATENT DOCUMENTS

| | | | |
|---|---|---|---|
| 2011/0252629 A1* | 10/2011 | Kunishi | H01G 4/105 |
| | | | 29/592.1 |
| 2013/0294006 A1* | 11/2013 | Kang | H01B 1/22 |
| | | | 977/734 |
| 2014/0002950 A1* | 1/2014 | Gu | H01G 4/005 |
| | | | 29/25.42 |
| 2017/0271083 A1* | 9/2017 | Makino | H01G 4/30 |
| 2017/0301468 A1* | 10/2017 | Kim | H01G 4/30 |
| 2018/0182552 A1* | 6/2018 | Sawada | H01G 4/232 |
| 2019/0355518 A1* | 11/2019 | Harada | H01G 4/30 |
| 2020/0105468 A1* | 4/2020 | Hashimoto | H01G 4/005 |
| 2020/0152387 A1 | 5/2020 | Takeuchi et al. | |

\* cited by examiner

MULTILAYER ELECTRONIC COMPONENT

CROSS-REFERENCE TO RELATED APPLICATION

This application claims benefit of priority to Korean Patent Application No. 10-2021-0192726 filed on Dec. 30, 2021 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), a multilayer electronic component, is an important chip component used in industries such as communications, computers, home appliances, and automobiles due to advantages of having a small size and guaranteeing high capacitance, and in particular, is a key passive element used in various electric, electronic and information communication devices such as mobile phones, computers, and digital TVs.

Conventionally, in order to mount multilayer ceramic capacitors on a substrate, external electrodes of the multilayer ceramic capacitors include a plating layer formed on an electrode layer. However, due to a high-temperature environment, the substrate may be bent and tin (Sn) included in the plating layer is oxidized during mounting, which may cause solder cracks or increased contact resistance.

To solve this problem, an external electrode structure including a first electrode layer containing copper (Cu) and a second electrode layer formed of an electrode containing silver (Ag) and palladium (Pd) has been used. In the case of using such external electrodes, a multilayer ceramic capacitor may be mounted on a substrate using silver epoxy as a conductive adhesive instead of tin soldering.

Conventionally, in the external electrode structure, a first electrode layer including copper is disposed on an end surface of a multilayer electronic component, and a band portion disposed to extend to portions of upper and lower surfaces of a body is formed to strengthen adhesion with the body. However, when the first electrode layer is fired, the first electrode layer contracts to apply compressive stress to the body, and in this case, due to the compressive stress applied to the upper and lower surfaces of the body as the band portion contracts, non-uniform stress distribution may be formed on the body. Accordingly, cracks may occur in the body of the multilayer electronic component, and adhesion strength may be lowered during mounting.

SUMMARY

An aspect of the present disclosure is to reduce compressive stress applied to a body when a first electrode layer is sintered.

An aspect of the present disclosure is also to solve a problem in which adhesion strength is lowered during mounting due to an occurrence of cracks due to compressive stress of a band portion.

Another aspect of the present disclosure is to solve a problem in which adhesion strength is lowered due to a weak bonding strength of external electrodes and a body when a first electrode layer is formed only on an end surface to suppress formation of a non-uniform stress distribution on the body.

According to an aspect of the present disclosure, a multilayer electronic component may include: a body including a dielectric layer and a plurality of internal electrodes disposed alternately with the dielectric layer therebetween and including first and second surfaces opposing each other in a first direction, third and fourth surfaces connected to the first and second surfaces and opposing each other in a second direction, and fifth and sixth surfaces connected to the first to fourth surfaces and opposing each other in a third direction; and external electrodes disposed on the body, wherein one end of each of the plurality of internal electrodes is connected to the third or fourth surface, the external electrodes include a first electrode layer disposed on the third and fourth surfaces and including a conductive metal and a second electrode layer disposed on the first electrode layer, including silver (Ag) and glass, and further including one or more of palladium (Pd), platinum (Pt), and gold (Au), and the first electrode layer is disposed to cover all of one end of the plurality of internal electrodes connected to the third and fourth surfaces and does not extend to the first, second, fifth, and sixth surfaces.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings.

In the drawings, a first direction may be defined as a stacking direction or thickness (T) direction, a second direction may be defined as a length (L) direction, and a third direction may be defined as a width (W) direction.

Figure 1:
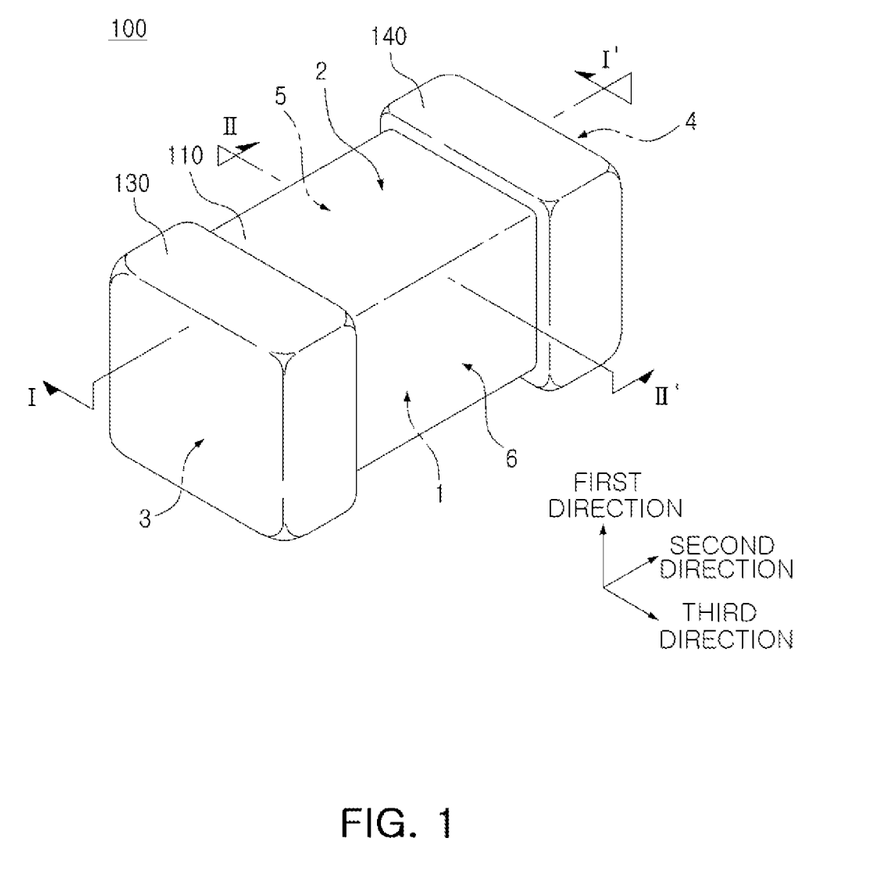
FIG. 1 is a perspective view schematically illustrating a multilayer electronic component according to an exemplary embodiment in the present disclosure.

FIG. 1 is a perspective view schematically illustrating a multilayer electronic component according to an exemplary embodiment in the present disclosure.

Figure 2:
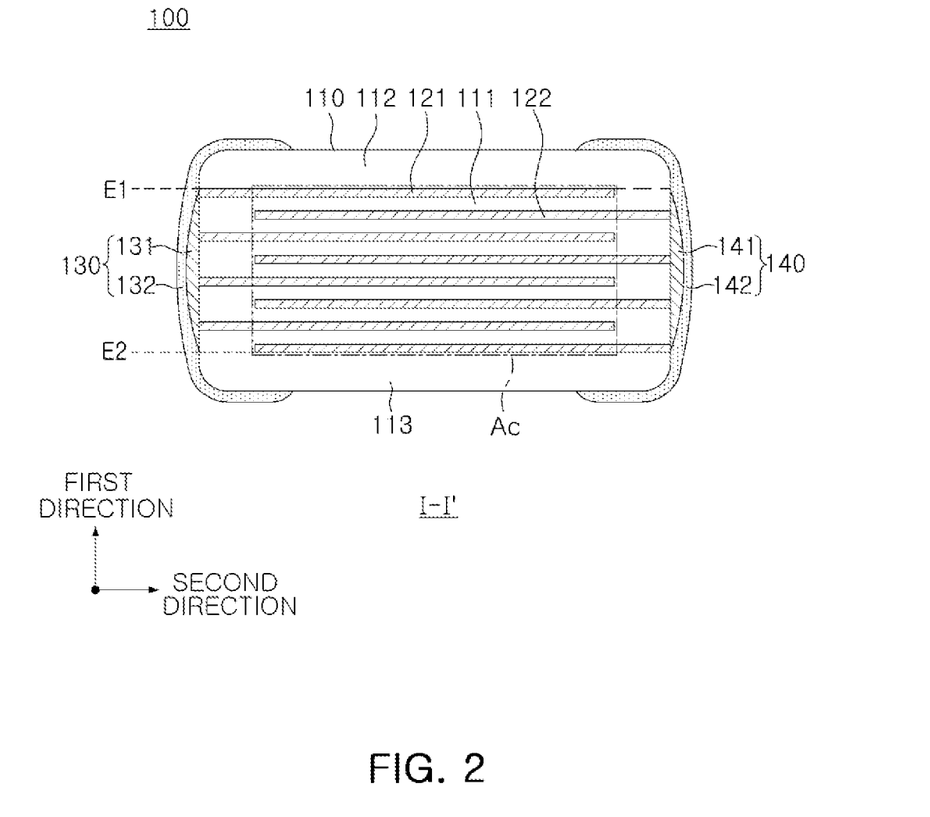
FIG. 2 is a cross-sectional view taken along line I-I' of FIG. 1.

FIG. 2 is a cross-sectional view taken along line I-I' of FIG. 1.

Figure 3:
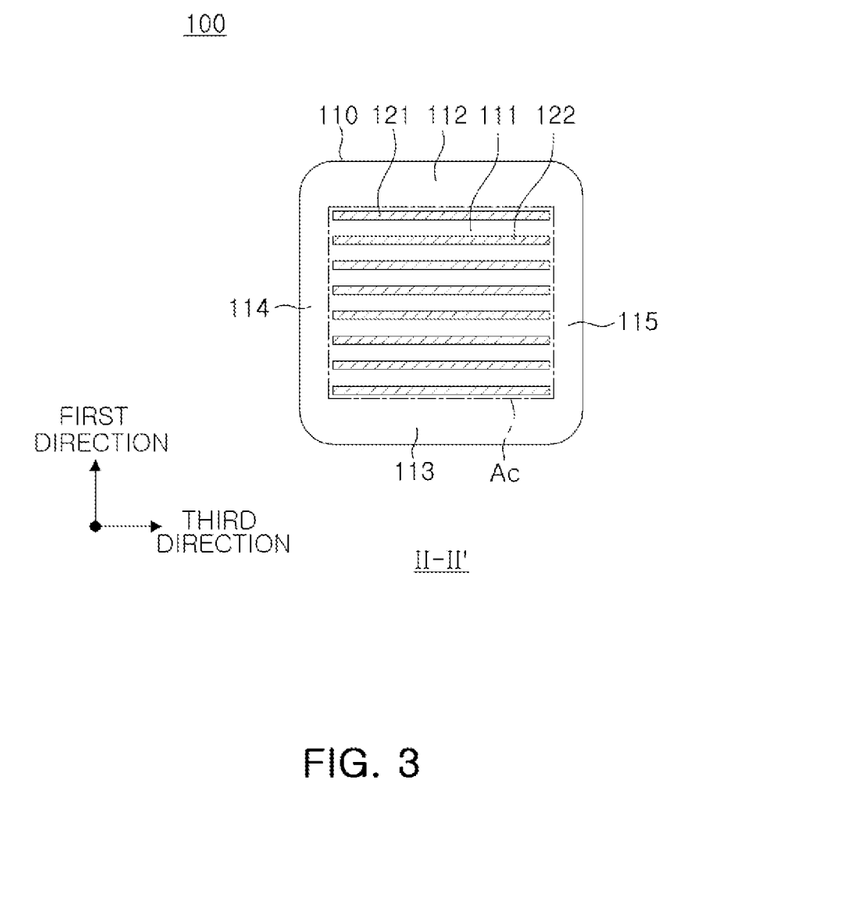
FIG. 3 is a cross-sectional view taken along line II-II' of FIG. 1.

FIG. 3 is a cross-sectional view taken along line II-II' of FIG. 1.

Figure 4:
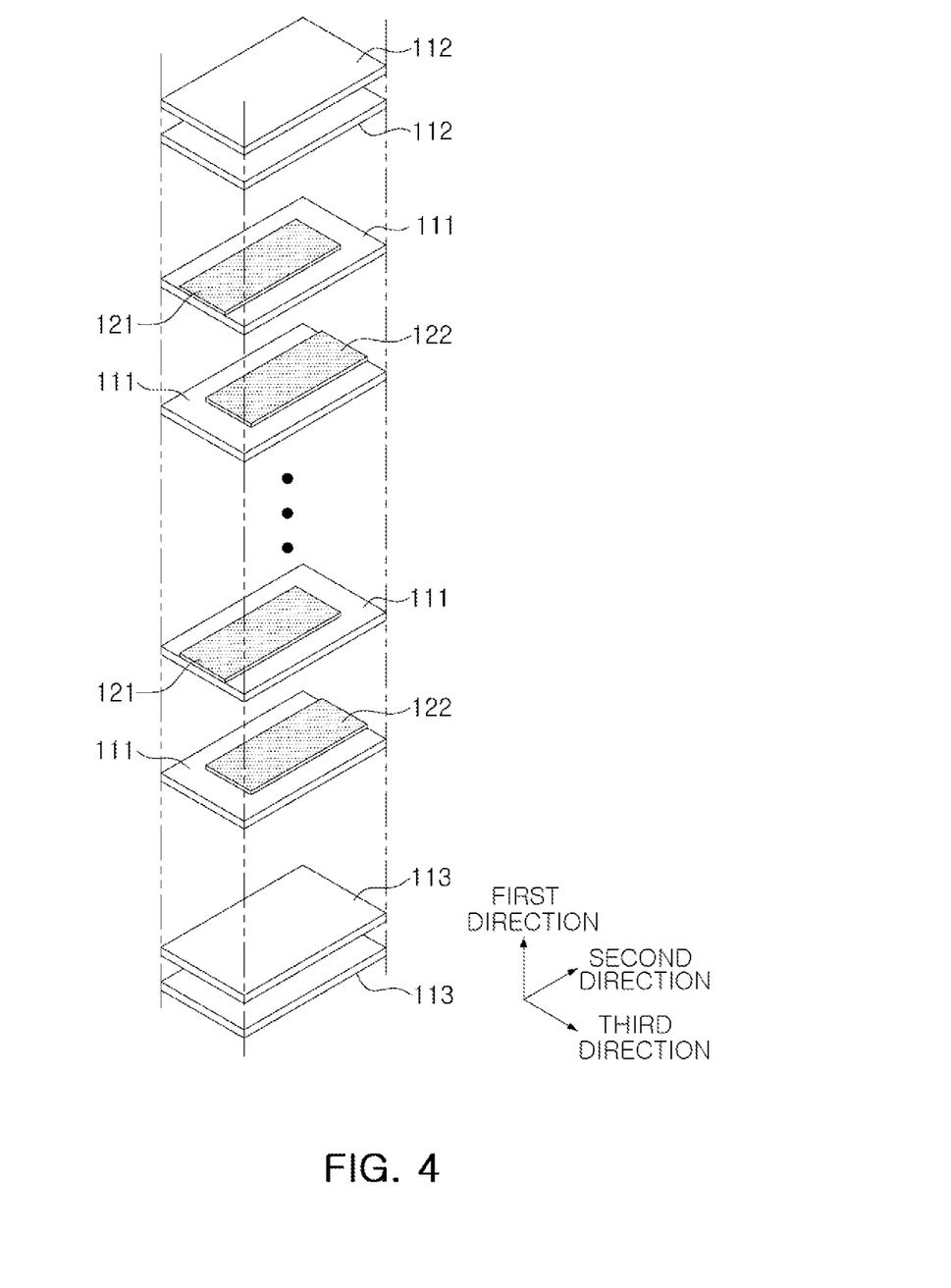
FIG. 4 is an exploded perspective view illustrating a body of a multilayer electronic component according to an exemplary embodiment in the present disclosure.

FIG. 4 is an exploded perspective view illustrating a body of a multilayer electronic component according to an exemplary embodiment in the present disclosure.

Hereinafter, a multilayer electronic component 100 according to an exemplary embodiment in the present disclosure will be described with reference to FIGS. 1 to 4.

The multilayer electronic component 100 according to the exemplary embodiment in the present disclosure includes a body 110 including a dielectric layer 111 and a plurality of internal electrodes 121 and 122 disposed alternately with the dielectric layer therebetween and including first and second surfaces 1 and 2 opposing each other in a first direction, third and fourth surfaces 3 and 4 connected to the first and second surfaces and opposing each other in a second direction, and fifth and sixth surfaces 5 and 6 connected to the first to fourth surfaces and opposing each other in a third direction; and external electrodes 130 and 140 disposed on the third and fourth surfaces, wherein one end of each of the plurality of internal electrodes is connected to the third or fourth surface, the external electrodes include first electrode layers 131 and 141 disposed on the body and including a conductive metal and second electrode layers 132 and 142 disposed on the first electrode layer, including silver (Ag) and glass, and further including one or more of palladium (Pd), platinum (Pt), and gold (Au), and the first electrode layer is disposed to cover all of one end of each of the plurality of internal electrodes connected to the third and fourth surfaces and may not extend to the first, second, fifth, and sixth surfaces.

In the body 110, a dielectric layer 111 and internal electrodes 121 and 122 are alternately stacked.

There is no particular limitation to a specific shape of the body 110 but, as shown, the body 110 may have a hexahedral shape or a shape similar thereto. Due to contraction (or shrinkage) of ceramic powder particles included in the body 110 during a firing process, the body 110 may have a substantially hexahedral shape, but may not have a hexahedral shape with perfectly straight lines.

The body 110 may have first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first and second surfaces 1 and 2, connected to the third and fourth surfaces 3 and 4, and opposing each other in the third direction.

A plurality of dielectric layers 111 forming the body 110 are in a sintered state, and adjacent dielectric layers 111 may be integrated such that boundaries therebetween may not be readily apparent without using a scanning electron microscope (SEM).

According to an exemplary embodiment in the present disclosure, a raw material for forming the dielectric layer 111 is not limited as long as sufficient electrostatic capacitance may be obtained. For example, a barium titanate-based material, a lead composite perovskite-based material, or a strontium titanate-based material may be used. The barium titanate-based material may include a $BaTiO_3$-based ceramic powder particles, and the ceramic powder particles may include $(Ba_{1-x}Ca_x)TiO_3$ (0<x<1), $Ba(Ti_{1-y}Ca_y)O_3$ (0<y<1), $(Ba_{1-x}Ca_x)(Ti_{1-y}Zr_y)O_3$ (0<x<1, 0<y<1) or $Ba(Ti_{1-y}Zr_y)O_3$ (0<y<1).

As a material for forming the dielectric layer 111, various ceramic additives, organic solvents, plasticizers, binders, dispersants, etc. may be added to the powder particles such as barium titanate ($BaTiO_3$) according to purposes of the present disclosure.

Meanwhile, an average thickness of the dielectric layer 111 does not need to be particularly limited. For example, an average thickness td of the dielectric layer 111 may be 0.2 μm or more and 2 μm or less.

However, in general, when the dielectric layer is formed to be thin with a thickness less than 0.6 μm, particularly when the thickness of the dielectric layer is 0.35 μm or less, a possibility of cracks occurring in the multilayer electronic component 100 due to compressive stress during firing of the external electrode may increase.

According to an exemplary embodiment in the present disclosure, the first electrode layers 131 and 141 are disposed to cover all ends of the plurality of internal electrodes connected to the third and fourth surfaces but do not extend to the first, second, and fifth and sixth surfaces, the occurrence of cracks due to compressive stress of the external electrodes may be suppressed even when the average thickness of the dielectric layer 111 is 0.35 μm or less. Therefore, when the average thickness of the dielectric layer 111 is 0.35 μm or less, a reliability improvement effect according to the present disclosure may be more remarkable.

The average thickness of the dielectric layer 111 may refer to an average thickness of the dielectric layer 111 disposed between the first and second internal electrodes 121 and 122.

The average thickness of the dielectric layer 111 may be measured by scanning an image of a cross-section of the body 110 in a length-thickness direction (L-T) with a scanning electron microscope (SEM) having a magnification of 10,000. More specifically, an average value may be measured by measuring a thickness of one dielectric layer at 30 points at equal intervals in a length direction in the scanned image. The 30 points at equal intervals may be designated in the capacitance forming portion Ac. In addition, if the average value is measured by extending the measurement of the average value to 10 dielectric layers, the average thickness of the dielectric layer may be further generalized.

The body 110 may include the capacitance forming portion Ac forming capacitance by including the first internal electrode 121 and the second internal electrode 122 disposed to face each other with the dielectric layer 111 interposed therebetween and cover portions 112 and 113 formed on upper and lower surface of the capacitance forming portion Ac in the first direction.

In addition, the capacitance forming portion Ac is a part contributing to capacitance formation of the capacitor, and may be formed by repeatedly stacking the plurality of first and second internal electrodes 121 and 122 with the dielectric layer 111 interposed therebetween.

The cover portions 112 and 113 include an upper cover portion 112 disposed above the capacitance forming portion Ac in the first direction and a lower cover portion 113 disposed below the capacitance forming portion Ac in the first direction.

The upper cover portion 112 and the lower cover portion 113 may be formed by stacking a single dielectric layer or two or more dielectric layers on upper and lower surfaces of the capacitance forming portion Ac in the thickness direction, respectively, and may serve to prevent damage to the internal electrodes due to physical or chemical stress.

The upper cover portion 112 and the lower cover portion 113 may not include an internal electrode and may include the same material as that of the dielectric layer 111.

That is, the upper cover portion 112 and the lower cover portion 113 may include a ceramic material, for example, a barium titanate (BaTiO$_3$)-based ceramic material.

Meanwhile, an average thickness of the cover portions 112 and 113 may not be limited. However, the average thickness of the cover portions 112 and 113 may be 15 μm or less in order to more easily achieve miniaturization and high capacitance in the multilayer electronic component. In addition, according to an exemplary embodiment in the present disclosure, the first electrode layers 131 and 141 may be disposed to cover all of one end of the plurality of internal electrodes connected to the third and fourth surfaces and do not extend to the first, second, fifth, and sixth surfaces, an occurrence of cracks in the multilayer electronic component may be suppressed even when the average thickness of the cover portion is 15 μm or less.

The average thickness of the cover portions 112 and 113 may refer to a size in the first direction and may be a value obtained by averaging sizes of the cover portions 112 and 113 in the first direction measured at five points at equal intervals above or below the capacitance forming portion Ac.

In addition, margin portions 114 and 115 may be disposed on a side surface of the capacitance forming portion Ac.

The margin portions 114 and 115 may include a margin portion 114 disposed on the fifth surface 5 of the body 110 and a margin portion 115 disposed on the sixth surface 6 of the body 110. That is, the margin portions 114 and 115 may be disposed on both end surfaces of the ceramic body 110 in the width direction.

As shown in FIG. 3, the margin portions 114 and 115 may refer to a region between both ends of the first and second internal electrodes 121 and 122 and a boundary surface of the body 110 in a cross-section taken in the width-thickness (W-T) direction of the body 110.

The margin portions 114 and 115 may basically serve to prevent damage to the internal electrodes due to physical or chemical stress.

The margin portions 114 and 115 may be formed as the internal electrodes are formed by applying a conductive paste on a ceramic green sheet excluding a region where the margin portions are to be formed.

In addition, in order to suppress a step difference due to the internal electrodes 121 and 122, the margin portions 114 and 115 may be formed by cutting the internal electrodes to be exposed to the fifth and sixth surfaces 5 and 6 of the body after stacking and subsequently stacking a single dielectric layer or two or more dielectric layers on both side surfaces of the capacitance forming portion Ac in the third direction (the width direction).

Meanwhile, the widths of the margin portions 114 and 115 do not need to be particularly limited. However, the average width of the margin portions 114 and 115 may be 15 μm or less in order to more easily achieve miniaturization and high capacitance of the multilayer electronic component. In addition, according to an exemplary embodiment in the present disclosure, the first electrode layers 131 and 141 are disposed to cover all of the end of the plurality of internal electrodes connected to the third and fourth surfaces and do not extend to the first, second, fifth, and sixth surfaces, an occurrence of cracks in the multilayer electronic component 100 due to compressive stress during firing of the external electrodes may be suppressed even when the average width of the margin portions 114 and 115 is 15 μm or less.

The average width of the margin portions 114 and 115 may refer to an average size of the margin portions 114 and 115 in the third direction, and may be a value obtained by averaging sizes of the margin portions 114 and 115 measured at five points at equal intervals in the third direction on a side surface of the capacitance forming portion Ac.

The plurality of internal electrodes 121 and 122 may be alternately disposed with the dielectric layer 111 interposed therebetween.

The plurality of internal electrodes 121 and 122 may include first and second internal electrodes 121 and 122. The first and second internal electrodes 121 and 122 are alternately disposed to face each other with the dielectric layer 111 constituting the body 110 interposed therebetween and may be connected to the third and fourth surfaces 3 and 4 of the body 110, respectively.

Specifically, one end of the first internal electrode 121 may be connected to the third surface, and one end of the second internal electrode 122 may be connected to the fourth surface.

The first internal electrode 121 may be spaced apart from the fourth surface 4 and exposed through the third surface 3, and the second internal electrode 122 may be spaced apart from the third surface 3 and exposed through the fourth surface 4. The first external electrode layer 131 may be disposed on the third surface 3 of the body to be connected to the first internal electrode 121, and a second external electrode layer 132 may be disposed on the fourth surface 4 of the body to be connected to the second internal electrode 122.

That is, the first internal electrode 121 is not connected to the second external electrode layer 132 but is connected to the first external electrode layer 131, and the second internal electrode 122 is not connected to the first external electrode layer 131 but is connected to the second external electrode layer 132. Accordingly, the first internal electrode 121 may be formed to be spaced apart from the fourth surface 4 by a predetermined distance, and the second internal electrode 122 may be formed to be spaced apart from the third surface 3 by a predetermined distance.

In this case, the first and second internal electrodes 121 and 122 may be electrically separated from each other by the dielectric layer 111 disposed therebetween.

The body 110 may be formed by alternately stacking a ceramic green sheet on which the first internal electrode 121 is printed and a ceramic green sheet on which the second internal electrode 122 is printed and subsequently firing the green sheets.

A material for forming the internal electrodes 121 and 122 is not particularly limited, and a material having excellent electrical conductivity may be used. For example, the internal electrodes 121 and 122 may include one or more of nickel (Ni), copper (Cu), palladium (Pd), silver (Ag), gold (Au), platinum (Pt), tin (Sn), tungsten (W), titanium (Ti), and alloys thereof.

In addition, the internal electrodes 121 and 122 may be formed by printing a conductive paste for internal electrodes including one or more of nickel (Ni), copper (Cu), palladium (Pd), silver (Ag), gold (Au), platinum (Pt), tin (Sn), tungsten (W), titanium (Ti), and alloys thereof on a ceramic green sheet. As a printing method of the conductive paste for internal electrodes, a screen printing method or a gravure printing method may be used but the present disclosure is not limited thereto.

In an exemplary embodiment, the internal electrodes 121 and 122 may include Ni. In this case, an alloy may be formed with copper (Cu) included in the first electrode layers 131a and 132a of the present disclosure, which will be described later, or electrical connectivity may be improved through metal bonding.

In addition, the average thickness of the internal electrodes 121 and 122 does not need to be particularly limited. For example, the average thickness of the internal electrodes 121 and 122 may be 0.2 µm or more and 2 µm or less.

However, in general, when the internal electrode is formed to be thinner to have a thickness less than 0.6 µm, in particular, when the thickness of the internal electrode is 0.35 µm or less, a possibility of cracks occurring in the multilayer electronic component 100 due to compressive stress during firing of the external electrodes may further increase.

According to an exemplary embodiment in the present disclosure, the first electrode layers 131 and 141 may be disposed to cover all of one end of the plurality of internal electrodes connected to the third and fourth surfaces and do not extend to the first, second, fifth, and sixth surfaces, an occurrence of cracks in the multilayer electronic component 100 due to compressive stress during firing of the external electrodes may be suppressed even when the average thickness of the internal electrodes 121 and 122 is 0.35 µm or less.

Accordingly, when the internal electrodes 121 and 122 have an average thickness of 0.35 µm or less, the effect according to the present disclosure may be more remarkable, and miniaturization and high capacitance of the multilayer electronic component may be more easily achieved.

The average thickness to of the internal electrodes 121 and 122 may refer to an average thickness of the internal electrodes 121 and 122.

The average thickness of the internal electrodes 121 and 122 may be measured by scanning an image of a cross-section of the body 110 in the length-thickness direction (L-T) with a scanning electron microscope (SEM) having a magnification of 10,000. More specifically, the average value may be measured by measuring a thickness of one internal electrode at 30 equal intervals in the length direction in the scanned image. The 30 points at equal intervals may be designated in the capacitance forming portion Ac. In addition, if the average value is measured by extending the measurement of the average value to 10 internal electrodes, the average thickness of the internal electrodes may be further generalized.

The external electrodes 130 and 140 may be disposed on the third surface 3 and the fourth surface 4 of the body 110. The external electrodes 130 and 140 may include first and second external electrodes 130 and 140 disposed on the third and fourth surfaces 3 and 4 of the body 110, respectively, and connected to the first and second internal electrodes 121 and 122, respectively.

In the present exemplary embodiment, a structure in which the multilayer electronic component 100 has two external electrodes 130 and 140 is described, but the number or shape of the external electrodes 130 and 140 may be modified according to shapes of the internal electrodes 121 and 122 or other purposes.

The external electrodes 130 and 140 may include first electrode layers 131 and 141 disposed on the body and including a conductive metal, respectively.

The first electrode layers 131 and 141 may be disposed on the third surface and the fourth surface of the body, and may serve to secure electrical connectivity with the internal electrodes including a conductive metal. That is, the first electrode layers 131 and 141 are in contact with and directly connected to the first and second internal electrodes 121 and 122 alternately connected to the third and fourth surfaces of the body 110 through one surface of the body in the second direction, respectively, to secure electrical conduction between the first and second external electrodes 130 and 140 and the first and second internal electrodes.

A type of the conductive metal included in the first electrode layers 131 and 141 is not particularly limited. The conductive metal may include the same metal as that included in the first and second internal electrodes 121 and 122 to improve electrical connectivity, and may include a metal forming an alloy with the metal included in the first and second internal electrodes 121 and 122.

The first electrode layer may be formed by applying a paste including conductive metal powder and glass on the body and then firing. A method of applying the paste on the body is not particularly limited. For example, the surface on which the first and second internal electrodes are exposed may be dipped into the paste or an electrode sheet may be transferred to the corresponding surface to be formed.

Accordingly, in an exemplary embodiment, the first electrode layers 131 and 141 may further include glass in addition to the conductive metal. Accordingly, a bonding strength between the first electrode layers 131 and 141 and the body 110 may be improved.

In an exemplary embodiment, the conductive metal included in the first electrode layers 131 and 141 may include copper (Cu). Accordingly, when the first and second internal electrodes 121 and 122 include nickel (Ni), a nickel (Ni)-copper (Cu) alloy may be formed to further improve electrical connectivity.

Conventionally, it has been attempted that the first electrode layer is disposed on the third surface and the fourth surface and includes a band portion disposed to extend to at least any one of the first surface, the second surface, the fifth surface, and the sixth surface of the body in order to improve bonding strength and flexural strength with the body.

However, when the first electrode layer is formed by firing, compressive stress due to contraction of the band portion may be transferred to the body, thereby forming a non-uniform stress distribution in the body.

In particular, since stress is concentrated on a region of the body covered with the first electrode layer, a large difference from stress of a portion not covered with the first electrode layer may occur. When stress is unevenly concentrated on the body in this manner, the multilayer electronic component may be subjected to bending stress and cracks may occur, and when the multilayer electronic component is mounted on a substrate by a conductive adhesive containing a resin and silver (Ag), adhesion strength may be reduced.

Accordingly, in the present disclosure, a phenomenon in which stress is concentrated on a local region of the body is suppressed by adjusting a position in which the first electrode layer is disposed on the body.

The first electrode layers 131 and 141 of the multilayer electronic component according to an exemplary embodiment in the present disclosure are disposed to cover all of one end of the plurality of internal electrodes connected to the third surface 3 and the fourth surface 4 and may not extend to the first surface, the second surface, the fifth surface, and the sixth surface. That is, the first electrode layers 131 and 141 are disposed on the third and fourth surfaces to secure electrical connectivity with the plurality of internal electrodes 121 and 122, and the first electrode layer is not formed on the first surface, the second surface, the fifth surface, and the sixth surface, thereby suppressing transmission of compressive stress to the body due to contraction during firing. Accordingly, a phenomenon in which stress is concentrated on a local region of the body can be inhibited, thereby suppressing the occurrence of cracks and improving adhesion strength.

The first electrode layers 131 and 141 may each have a thickness that tapers toward at least one end of each first electrode layer. The thickness of the first electrode layer may be measured, for example, along the second direction and in a cross-section of the body 110 in a plane along the first and second directions with a scanning electron microscope (SEM) having a magnification of 10,000.

Referring to FIG. 2, in an exemplary embodiment, the first electrode layers 131 and 141 may be disposed not to cover the cover portions 112 and 113. Specifically, the first electrode layers 131 and 141 may be disposed between a straight extension line E1 drawn in the second direction from the uppermost end of the plurality of internal electrodes 121 and 122 in the first direction and a straight extension lines E2 drawn in the second direction from the lowermost end of the plurality of internal electrodes 121 and 122 in the first direction.

Accordingly, the stress applied to the upper and lower cover portions 112 and 113 of the body 110 when the first electrode layer is fired may be minimized, thereby suppressing the occurrence of cracks in the body 110 and improving adhesion strength. In addition, since the first electrode layers 131 and 141 do not cover the cover portions, capacitance per unit volume of the multilayer electronic component 100 may be maximized by minimizing a proportion of the external electrodes 130 and 140.

Figure 5:
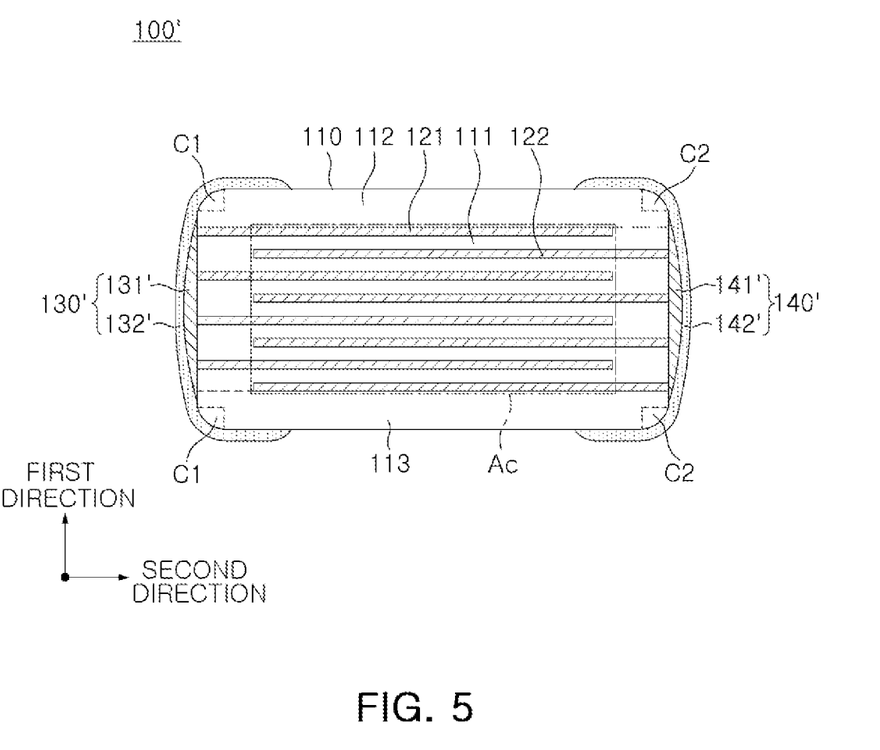
FIG. 5 is a cross-sectional view of a multilayer electronic component according to an exemplary embodiment in the present disclosure corresponding to FIG. 2.

FIG. 5 is a cross-sectional view of a multilayer electronic component 100' according to an exemplary embodiment in the present disclosure corresponding to FIG. 2.

Referring to FIG. 5, in the body 110 of the multilayer electronic component 100' according to an exemplary embodiment, the ends of the first to sixth surfaces 1, 2, 3, 4, 5, and 6 may be contracted, and such an end may be defined as a corner.

Accordingly, the body 110 may include a first corner C1 connecting the third surface 3 to the first surface 1, the second surface 2, the fifth surface 5, and the sixth surface 6 and a second corner C2 connecting the fourth surface 4 to the first surface 1, the second surface 2, the fifth surface 5, and the sixth surface 6. The first and second corners may have a round shape as the ends of the first to sixth surfaces contract during a firing process or by a polishing process.

The multilayer electronic component 100' according to an exemplary embodiment may include external electrodes 130' and 140' disposed on the third and fourth surfaces 3 and 4 of the body 110, and the external electrodes 130' and 140' include first electrode layers 131' and 141' disposed on the body 110 and including a conductive metal. The first electrode layers 131' and 141' may be disposed to cover all of one end of the plurality of internal electrodes connected to the third and fourth surfaces, do not extend to the first, second, fifth, and sixth surfaces, and may be disposed not to cover the first and second corners C1 and C2 of the body 110.

Accordingly, a proportion of the external electrodes 130' and 140' may be reduced to secure an appropriate capacitance per unit volume of the multilayer electronic component 100', and at the same time, the phenomenon of stress concentration on the corners of the body may be alleviated to reduce the occurrence of cracks in the multilayer electronic component 100'.

Figure 6:
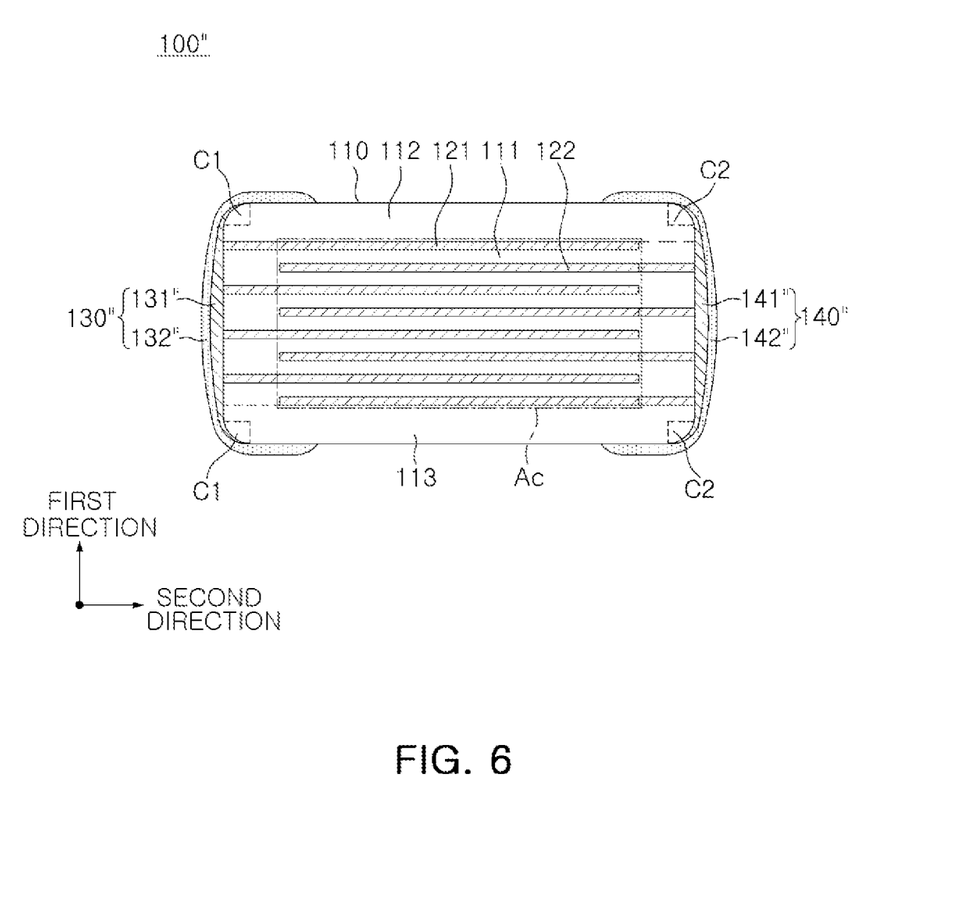
FIG. 6 is a cross-sectional view of a multilayer electronic component according to an exemplary embodiment in the present disclosure corresponding to FIG. 2.

FIG. 6 is a cross-sectional view of a multilayer electronic component 100" according to an exemplary embodiment in the present disclosure corresponding to FIG. 2.

Referring to FIG. 6, in the multilayer electronic component 100" according to an exemplary embodiment, external electrodes 130" and 140" are disposed on the third and fourth surfaces 3 and 4 of the body 110, and the external electrodes 130" and 140" include first electrode layers 131" and 141" disposed on the body 110 and including a conductive metal. The first electrode layers 131" and 141" are disposed to cover all of one end of the plurality of internal electrodes connected to the third and fourth surfaces but do not extend to the first, second, fifth, and sixth surfaces, and may be disposed to cover the first and second corners C1 and C2 of the body 110. As described above, since the corners of the body are formed by a polishing process or as the ends of the first to sixth surfaces of the body contract during a firing process, denseness of a dielectric microstructure may be weak. In addition, since the corner portions are disposed closest to the internal electrode disposed at the uppermost end and the internal electrode disposed at the lowermost end of the plurality of internal electrodes 121 and 122, if moisture penetrates through the corners, reliability of the multilayer electronic component may be adversely affected.

In the multilayer electronic component 100" according to an exemplary embodiment, the first electrode layers 131" and 141" are disposed to cover the first and second corners of the body, thereby completely covering the corners of the body vulnerable to moisture penetration, and therefore, since the first electrode layers 131" and 141" are not disposed on the first surface, the second surface, the fifth surface, and the sixth surface, the occurrence of cracks may be suppressed by alleviating stress concentration on a local region, while moisture-resistance reliability of the multilayer electronic component 100" is improved.

The second electrode layers 132 and 142 may be disposed on the first electrode layer and may include silver (Ag) and, in addition, palladium (Pd).

The second electrode layer may serve to prevent oxidation and prevent penetration of moisture and hydrogen. In addition, since the second electrode layer includes silver (Ag), mounting may be performed on the substrate by a conductive adhesive including silver (Ag) and resin without a solder including tin (Sn).

Accordingly, a problem of solder cracks occurring due to stress due to a difference in thermal expansion coefficient between the external electrodes and the solder in a high temperature-low temperature cycle.

Meanwhile, when the second electrode layer includes only silver (Ag) or the content of silver (Ag) is increased, ion migration may occur.

Accordingly, the second electrode layers 132 and 142 may further contain palladium (Pd) to suppress the occurrence of ion migration, and palladium (Pd) may be replaced or mixed with another metal capable of preventing ion migration, such as platinum (Pt) or gold (Au), etc.

The second electrode layers 132 and 142 may be disposed on the first electrode layers, and may be disposed to extend on a portion of the first surface, the second surface, the fifth surface, and the sixth surface of the body 110. Accordingly, the moisture resistance reliability of the multilayer electronic component 100 may be improved and flexural strength may be improved so that the multilayer electronic component 100 may be protected from external bending stress when mounted on a substrate.

In some embodiments, the second electrode layers 132 and 142 may not a plating layer that is formed by, for example, electroplating.

In an exemplary embodiment, the second electrode layers 132 and 142 may further include glass. Glass may control a sintering rate of silver (Ag) and palladium (Pd) metals when forming the second electrode layers 132 and 142 by applying and firing a paste, reduce stress applied to the body 110 during sintering, and secure adhesion to the substrate.

The glass component may have a composition in which oxides are mixed, and may be one or more selected from the group consisting of silicon oxide, boron oxide, aluminum oxide, transition metal oxide, alkali metal oxide, and alkaline earth metal oxide but is not particularly limited. The transition metal may be one or more selected from the group consisting of zinc (Zn), titanium (Ti), vanadium (V), manganese (Mn), iron (Fe), and nickel (Ni), the alkali metal may be one or more selected from the group consisting of lithium (Li), sodium (Na), and potassium (K), and the alkaline earth metal may be one or more selected from the group consisting of magnesium (Mg), calcium (Ca), strontium (Sr), and barium (Ba).

The second electrode layers 132 and 142 may be formed by applying a conductive paste including silver (Ag) particles, further including one or more of palladium (Pd) particles, platinum (Pt) particles, and gold (Au) particles, and in addition, glass to a portion of the body and the first electrode layers 131 and 132 and then performing firing. In this case, the first electrode layer and the second electrode layer may be simultaneously fired, but is not limited thereto.

The content of glass included in the conductive paste forming the second electrode layers 132 and 142 may be 10 wt % or more and 30 wt % or less based on a total weight of the conductive paste. Accordingly, a problem in which adhesion strength is weak due to weak adhesion to the body during firing when the content of glass is less than 10 wt % based on the total weight of the conductive paste and a problem in which glass beading occurs in the second electrode glass after firing due to an excessive content of glass when the content of glass is more than 30 wt % may be solved.

Meanwhile, in a cross-section after firing the second electrode layers 132 and 142, an area occupied by the glass included in the second electrode layer may be 1/10 or more and 3/10 or less of the area occupied by the conductive metal particles such as silver (Ag) particles, palladium (Pd) particles, platinum (Pt) particles, and gold (Au) particles. Accordingly, a problem in which adhesion strength is weak due to weak bonding strength to the body during firing when the area occupied by glass is less than 1/10 of the area of the conductive metal in the cross-section of the second electrode layer may be solved and a problem in which the occurrence of glass beading in the second electrode layer after firing due to an excessive content of glass when the area occupied by glass exceeds 3/10 of the area of the conductive metal may be solved.

Glass and conductive metal or conductive metal particles included in the second electrode layer may be distinguished through EDS analysis due to a difference in composition. Glass and conductive metal particles may also be distinguished by EDS analysis of a back scattered electron (BSE) image of a scanning electron microscope (SEM) capable of comparing relative contrast.

Accordingly, a BSE image of a region of length×thickness=10 μm×10 μm based on a center of the second electrode layer disposed on the third surface or the fourth surface of the body in the thickness direction in the length-thickness cross-section (L-T cross-section) taken from the center of the multilayer electronic component in the width direction may be converted into an image that compares the contrast and color relatively on a pixel basis, and the area of glass and the area of conductive metal may be measured to be calculated through a program in EDS.

Meanwhile, the components of the first electrode layers 131 and 141 and the second electrode layers 132 and 142 may be calculated from images observed using a scanning electron microscope-energy dispersive X-ray Spectroscopy (SEM-EDS). Specifically, after the multilayer electronic component is polished to the center in the width direction (third direction) to expose the cross-section in the length-thickness direction (L-T cross-section), the region of length× thickness=10 μm×10 μm based on the center of the first and second electrode layers disposed on the third surface or the fourth surface of the body in the thickness direction is subjected to EDS analysis to measure components, at % and wt % of each element included in the first and second electrode layers.

Figure 7:
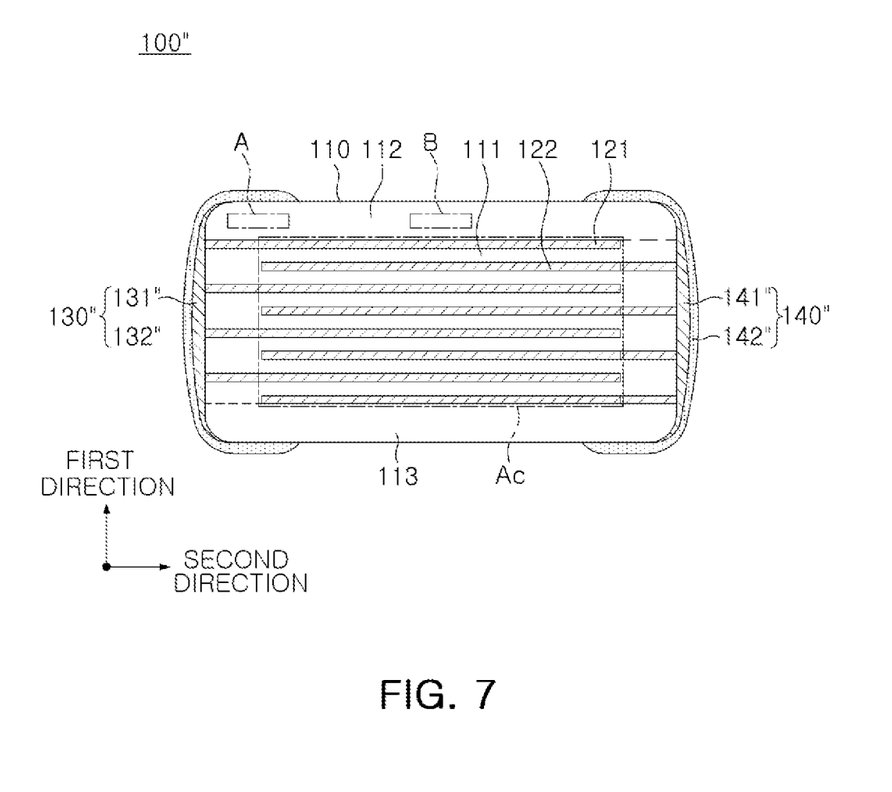
FIG. 7 is a cross-sectional view schematically illustrating a region in which a stress is measured in a multilayer electronic component according to an exemplary embodiment in the present disclosure corresponding to FIG. 2.

FIG. 7 is a cross-sectional view schematically illustrating a region in which stress is measured in a multilayer electronic component according to an exemplary embodiment in the present disclosure corresponding to FIG. 2.

Referring to FIG. 7, the body 110 of the multilayer electronic component 100" according to an exemplary embodiment may include a capacitance forming portion Ac including a plurality of internal electrodes alternately disposed with the dielectric layer interposed therebetween to form capacitance and cover portions 112 and 113 disposed upper and lower surfaces of the capacitance forming portion in the first direction, and when a value of average residual stress measured in a region A of the cover portions 112 and 113 covered with the second electrode layer is Sa and a value of average residual stress measured in a region B not covered with the second electrode layer is Sb, {(Sa−Sb)/Sb}×100 may be 0.10 or less.

Accordingly, a phenomenon in which stress is concentrated on a portion of the cover portions 112 and 113 of the body 110 may be minimized, thereby suppressing a phenomenon in which cracks occur in the multilayer electronic component 100".

In this case, the region A covered with the second electrode layer may refer to a central region of the cover portion covered with the second electrode layer in the cross-section in the length-thickness direction (L-T cross-section) taken from the central portion in the width direction, and the region B not covered with the second electrode layer may refer to a central region of the cover portion not covered with the second electrode layer. In addition, Sa and Sb may be average values measured through Raman shift analysis at five arbitrary points in each of regions A and B.

When residual stress occurs in a specific region of the multilayer electronic component, a high-voltage phase transition occurs and a Raman shift phenomenon may be observed when analyzed by a Raman spectrum. At this time, since the Raman shift tends to decrease when residual stress decreases and the Raman shift tends to increase when residual stress increases, the residual stress value of each region may be measured according to the magnitude of the Raman shift.

A size of the multilayer electronic component 100 may not be particularly limited.

However, in order to achieve both miniaturization and high capacitance, the number of layers needs to be increased by reducing the thickness of the dielectric layer and the internal electrodes, and thus, the effect of improving adhesion strength according to the present exemplary embodiment may be remarkable in a multilayer electronic component having a 0603 size (length×width, 0.6 mm×0.3 mm) or less.

Accordingly, when the length of the multilayer electronic component 100 is 0.66 mm or less and the width thereof is 0.33 mm or less, taking into account a manufacturing error and a size of the external electrodes, the effect of improving adhesion strength according to the present disclosure may be more remarkable. Here, the length of the multilayer electronic component 100 refers to a maximum size of the multilayer electronic component 100 in the second direction, and the width of the multilayer electronic component 100 refers to a maximum size of the multilayer electronic component 100 in the third direction.

EXAMPLE

Table 1 below shows measurement and evaluation of deterioration of insulation resistance, stress change, crack incidence rate, and adhesion strength after mounting on a substrate, while changing regions in which the first electrode layer is disposed.

As for the region in which the first electrode layer is disposed, the measurement and evaluation were conducted separately on a case (test No. 1) in which the first electrode layer is disposed not to completely cover but to partially cover one end of a plurality of internal electrodes connected to the third surface and the fourth surface of the body, a case (test No. 2) in which the first electrode layer is disposed to cover all of one end of the plurality of internal electrodes connected to the third surface and the fourth surface of the body and do not extend to the first, second, fifth, and sixth surfaces of the body, and a case (test No. 3) in which the first electrode layer is disposed to cover all of one end of the plurality of internal electrodes connected to the third surface and the fourth surface of the body and extends to the first, second, fifth, and sixth surfaces of the body.

Deterioration of insulation resistance (IR) is measured by the 8585 test.

When a voltage of 1-1.5V is applied for 15-30 hr in an 85° C./humidity 85% environment, it is judged as NG if it falls to ⅓ order or less than an existing chip. When there is more than one per 100 samples, it is considered as NG for IR deterioration characteristics.

As for the stress change, the multilayer electronic component was polished to a central position in the width direction (third direction) to expose the cross-section in the length-thickness direction (L-T cross-section), and thereafter, average residual stresses (Sa and Sb) were separately calculated through Raman shift analysis at five arbitrary points of the central region A of the cover portion covered with the second electrode layer and five arbitrary points of the central region B of a region not covered with the second electrode layer, and a value of {(Sa−Sb)/Sb}×100 was calculated.

To determine whether cracks occur, the cross-sections of 100 multilayer electronic component samples per test No. in the width-thickness direction (W-T cross-section) were polished until the external electrodes were peeled off, and then observed through a scanning electron microscope or an optical microscope to check the presence of cracks.

As for adhesion strength after mounting, a temperature cycle of −55° C. to +125° C. (maintained at the Min./Max. temperature for 30 minutes each) for 100 multilayer electronic component samples mounted on the substrate for each test No., and thereafter, a maximum force until deformation of 2 mm or more occurred was measured and averaged in a shear test.

TABLE 1

| Test No. | IR deterioration | Stress change (%) | Crack incidence rate (%) | Adhesion strength after mounting (N/mm²) |
|---|---|---|---|---|
| 1 | NG | 0.1 | 0 (0/100) | 23 |
| 2 | OK | 0.1 | 0 (0/100) | 24 |
| 3 | OK | 0.18 | 80 (80/100) | 9.5 |

In the case of Test No. 1, it can be seen that stress was not concentrated on a local region of the body, so cracks did not occur and the adhesion strength after mounting is good, but IR deterioration occurred because electrical connectivity is insufficient due to a small amount of nickel (Ni)-copper (Cu) alloy formation between the first and second internal electrodes 121 and 122 and the first electrode layers 131 and 141.

In the case of Test No. 2, it can be seen that, since the first electrode layers 131 and 141 are disposed not to cover the first, second, fifth, and sixth surfaces of the body, stress was not concentrated on a local region of the body, cracks did not occur, and adhesion strength after mounting was excellent. In addition, since nickel (Ni) of the first and second internal electrodes 121 and 122 and copper (Cu) of the first electrode layer are sufficiently diffused to form a nickel (Ni)-copper (Cu) alloy, electrical connectivity was excellent and IR deterioration did not occur.

In the case of Test No. 3, it can be seen that, since the first electrode layer was disposed to cover at least one of the first, second, fifth, and sixth surfaces of the body, stress was concentrated on a local region of the body to cause a stress change of 0.18%, and as a result, the occurrence of cracks in the body 110 was not suppressed to lower adhesion strength when mounted on the substrate.

Accordingly, in the multilayer electronic component according to an exemplary embodiment in the present disclosure, the first electrode layer is disposed to cover all of one end of the plurality of internal electrodes connected to the third and fourth surfaces of the body and does not extend to the first surface, the second surface, the fifth surface, and the sixth surface of the body, so that a phenomenon in which stress is concentrated on a local region of the body may be suppressed to prevent the occurrence of cracks, adhesion strength may be improved when mounted on the substrate, and IR degradation may be prevented by securing sufficient electrical connectivity with the internal electrodes.

One of the various effects of the present disclosure is to suppress a phenomenon in which stress is concentrated on a region of the body corresponding to a band portion after firing of the first electrode layer by controlling a region in which the first electrode layer is disposed.

One of the various effects of the present disclosure is to reduce the occurrence of cracks in the body by suppressing non-uniform stress distribution in the body after firing the first electrode layer, and to improve adhesion strength during mounting.

One of the various effects of the present disclosure is to improve adhesion strength during mounting by controlling the content of glass included in the second electrode layer even when the first electrode layer is formed only on an end surface of the body in order to suppress formation of non-uniform stress distribution in the body.

While exemplary embodiments have been shown and described above, it will be apparent to those skilled in the art that modifications and variations could be made without departing from the scope of the present disclosure as defined by the appended claims.

What is claimed is:

1. A multilayer electronic component comprising:
a body including a dielectric layer and a plurality of internal electrodes disposed alternately with the dielectric layer therebetween and including first and second surfaces opposing each other in a first direction, third and fourth surfaces connected to the first and second surfaces and opposing each other in a second direction, and fifth and sixth surfaces connected to the first to fourth surfaces and opposing each other in a third direction; and
external electrodes disposed on the body,
wherein one end of each of the plurality of internal electrodes is connected to the third or fourth surface,
the external electrodes include a first electrode layer disposed on the third and fourth surfaces and including a conductive metal and a second electrode layer disposed on the first electrode layer, including silver (Ag) and glass, and further including one or more of palladium (Pd), platinum (Pt), and gold (Au),
the first electrode layer is disposed to cover all of one end of each of the plurality of internal electrodes connected to the third and fourth surfaces and does not extend onto the first, second, fifth, and sixth surfaces,
the body includes a capacitance forming portion including the plurality of internal electrodes alternately disposed with the dielectric layer interposed therebetween to form capacitance and cover portions disposed on upper and lower surfaces of the capacitance forming portion in the first direction, and
the first electrode layer has a thickness that tapers from a portion of the first electrode layer that overlaps the capacitance forming portion in the second direction to beyond the upper and lower surfaces of the capacitance forming portion in the first direction.

2. The multilayer electronic component of claim 1, wherein the body includes a first corner connecting the third surface to the first, second, fifth, and sixth surfaces and a second corner connecting the fourth surface to the first, second, fifth, and sixth surfaces.

3. The multilayer electronic component of claim 2, wherein the first electrode layer is disposed to cover the first corner and the second corner.

4. The multilayer electronic component of claim 2, wherein the first electrode layer is disposed not to cover the first corner and the second corner.

5. The multilayer electronic component of claim 1, wherein the plurality of internal electrodes include nickel.

6. The multilayer electronic component of claim 5, wherein the first electrode layer includes copper.

7. The multilayer electronic component of claim 1, wherein the first electrode layer includes glass.

8. The multilayer electronic component of claim 1, wherein the second electrode layer is disposed on the first electrode layer and extends to a portion of the first surface or the second surface.

9. The multilayer electronic component of claim 1, wherein, in the cover portions, $\{(Sa-Sb)/Sb\}\times 100$ is 0.10 or less in which Sa is a value of an average residual stress measured in a region covered with the second electrode layer and Sb is a value of an average residual stress measured in a region not covered with the second electrode layer.

10. The multilayer electronic component of claim 1, wherein an average thickness of the dielectric layer is 0.35 μm or less.

11. The multilayer electronic component of claim 1, wherein an average thickness of the cover portions is 15 μm or less.

12. The multilayer electronic component of claim 1, wherein the second electrode layer is not a plating layer.

13. The multilayer electronic component of claim 1, wherein the second electrode layer includes Pd.

14. A multilayer electronic component comprising:
a body including a dielectric layer and a plurality of internal electrodes disposed alternately with the dielectric layer therebetween and including first and second surfaces opposing each other in a first direction, third and fourth surfaces connected to the first and second surfaces and opposing each other in a second direction, and fifth and sixth surfaces connected to the first to fourth surfaces and opposing each other in a third direction; and
external electrodes disposed on the body,
wherein one end of each of the plurality of internal electrodes is connected to the third or fourth surface,
the external electrodes include a first electrode layer disposed on the third and fourth surfaces and including a conductive metal and a second electrode layer disposed on the first electrode layer, including silver (Ag) and glass, and further including one or more of palladium (Pd), platinum (Pt), and gold (Au),
the first electrode layer is disposed to cover all of one end of each of the plurality of internal electrodes connected to the third and fourth surfaces and does not extend onto the first, second, fifth, and sixth surfaces,
the body includes a capacitance forming portion including the plurality of internal electrodes alternately disposed with the dielectric layer interposed therebetween to form capacitance and cover portions disposed on upper and lower surfaces of the capacitance forming portion in the first direction,
wherein the first electrode layer is disposed not to cover any part of the cover portions in the second direction.

15. The multilayer electronic component of claim 14, wherein the plurality of internal electrodes include nickel.

16. The multilayer electronic component of claim 15, wherein the first electrode layer includes copper.

17. The multilayer electronic component of claim 14, wherein the first electrode layer includes glass.

18. The multilayer electronic component of claim 14, wherein the second electrode layer is disposed on the first electrode layer and extends to a portion of the first surface or the second surface.

19. The multilayer electronic component of claim 14, wherein the second electrode layer is not a plating layer.

20. The multilayer electronic component of claim 14, wherein the second electrode layer includes Pd.

* * * * *